United States Patent [19]

Krambrock et al.

[11] Patent Number: 5,169,607
[45] Date of Patent: Dec. 8, 1992

[54] MOVING-BED REACTOR, IN PARTICULAR FOR THE TREATMENT OF FLUE GASES

[75] Inventors: Wolfgang Krambrock, Vogt; Joerg Schwedes, Braunschweig; Harald Wilms, Tettnang, all of Fed. Rep. of Germany

[73] Assignee: AVT Anlagen- und Verfahrenstechnik GmbH, Weingarten, Fed. Rep. of Germany

[21] Appl. No.: 647,505

[22] Filed: Jan. 29, 1991

[30] Foreign Application Priority Data

Feb. 20, 1990 [DE] Fed. Rep. of Germany ....... 4005226

[51] Int. Cl.⁵ .............................................. B01J 8/08
[52] U.S. Cl. ................................... 422/219; 422/218;
422/213; 422/216; 427/191; 427/192; 427/193;
55/390; 55/482; 55/484
[58] Field of Search ............... 422/216, 218, 219, 211,
422/213, 190, 191, 192, 193; 55/390, 474, 482, 484

[56] References Cited

U.S. PATENT DOCUMENTS

| | | |
|---|---|---|
| 1,547,924 | 7/1925 | Kerschbaum . |
| 1,702,311 | 2/1929 | Pantenburg . |
| 1,836,301 | 12/1931 | Bechthold . |
| 2,379,195 | 6/1945 | Simpson et al. ................. 422/216 X |
| 2,514,371 | 7/1950 | Caldwell .......................... 422/216 X |
| 2,577,791 | 12/1951 | McKinney ........................... 422/216 |
| 2,595,224 | 5/1952 | Caldwell .......................... 422/216 X |
| 2,780,310 | 2/1957 | Schaub ............................. 422/216 X |
| 2,783,889 | 3/1957 | Schaub ............................. 422/216 X |
| 3,027,244 | 3/1962 | Byrne et al. ........................ 422/218 |
| 3,649,215 | 3/1972 | Perga et al. ...................... 422/177 X |
| 3,928,532 | 12/1975 | Squires . |
| 4,650,647 | 3/1987 | Kito et al. . |

FOREIGN PATENT DOCUMENTS

| | | |
|---|---|---|
| 8700768 | 2/1984 | European Pat. Off. . |
| 945025 | 12/1955 | Fed. Rep. of Germany . |
| 3228984 | 11/1983 | Fed. Rep. of Germany . |
| 3528222 | 2/1987 | Fed. Rep. of Germany . |
| 3638611 | 5/1988 | Fed. Rep. of Germany . |
| 3732567 | 11/1988 | Fed. Rep. of Germany . |
| 3732424 | 4/1989 | Fed. Rep. of Germany . |
| 3835550 | 2/1990 | Fed. Rep. of Germany . |
| 3904697 | 8/1990 | Fed. Rep. of Germany . |
| 3915416 | 11/1990 | Fed. Rep. of Germany . |
| 3923645 | 1/1991 | Fed. Rep. of Germany . |
| 655960 | 6/1988 | Switzerland . |
| 721288 | 1/1955 | United Kingdom . |
| 739372 | 10/1955 | United Kingdom . |

OTHER PUBLICATIONS

A. W. Jenike "Storage and Flow of Solids" vol. 53, No. 26, Nov. 1964.

Primary Examiner—Robert J. Warden
Assistant Examiner—Christopher Y. Kim
Attorney, Agent, or Firm—Spencer, Frank & Schneider

[57] ABSTRACT

A moving bed reactor for the treatment of fluid in a countercurrent process includes a reactor vessel having, in an upper region thereof, an inlet for receiving particulate material and an outlet for discharging treated fluid, the reactor vessel also having, in a lower region thereof, a downward tapering first funnel leading to an outlet, the first funnel guiding the particulate material to the outlet for discharge from the reactor vessel, the first funnel being formed by wall sections which mutually overlap in louvre fashion to create slot-shaped passages for the fluid to be treated to enter the vessel. A second funnel is provided, surrounding the first funnel and communicating with the slot-shaped passages, the second funnel having an inlet for receiving the fluid to be treated, there being provided an annular canal between the second funnel and the first funnel at the lower regions thereof, which annular canal communicates with the particulate discharge outlet so that any particulate material which enters the second funnel by the slot-shaped passages is guided to the particulate discharge outlet through the annular canal.

14 Claims, 5 Drawing Sheets

MOVING-BED REACTOR, IN PARTICULAR FOR THE TREATMENT OF FLUE GASES

BACKGROUND OF THE INVENTION

The invention relates to a moving-bed reactor for the treatment of fluids, in particular of flue gases from power station installations or the like, in accordance with the preamble of claim 1.

As indicated in DE 3,732,567 Al, moving-bed reactors are used for the treatment of fluids, for example flue gases, over more or less fine-grained loose materials. The loose material forms a loose-material bed moving downwards through the reactor and is fed into the reactor at the top and discharged at the bottom continuously, quasi-continuously or batchwise. In the region of the loose-material discharge from the treatment zone, a so-called inflow tray is provided which has outlet openings for the loose material on the one hand and inlet openings for the fluid to be treated on the other hand. It is essential here that the fluid to be treated is distributed as uniformly as possible in the entire moving-bed reactor, so that the moving loose material as a whole acts as an absorbtion filter, i.e. the pollutants are bound to the surface of the loose material. The technology of these absorption filter installations is adequately known and described, for example, also in WO 87/00768 with further literature references, for example German patent specification 3,228,984. The problem in moving-bed reactors of this type is, inter alia, to obtain the most uniform distribution possible of the gas to be treated within the downward-moving loose material, an optimization of the required loose-material rate being necessary. In the cited state of the art, the flow of the loose-material layer through the gas to be treated takes place in the so-called countercurrent process, i.e. the gas moving upwards flows in countercurrent through the loose material moving down in the reactor.

Furthermore, there are so-called crossflow installations, in which the loose material flowing downwards in a cylindrical or prismatic housing is penetrated transversely by the flue gas which is to be treated. In this case, the gas is fed along the entire loose-material height to the cylindrical housing by means of louvre-type slots in the housing wall. Admittedly, the crossflow installations have the advantage that in general no additional inflow trays are required in the interior of the reactor, as is the case in the abovementioned printed publications. In fact, such inflow trays serving to produce uniform distribution of the gas within the reactor have the disadvantage that the uniform downward flow of the loose material can be adversely affected. In order to ensure that all the loose material present in the reactor can participate in the reaction, it is absolutely necessary that so-called mass flux takes place throughout the reactor. For a definition of mass flux, attention is brought to the following literature reference: A. W. Jenike, Storage and Flow of Solids, Bulletin 123 of the UTAH Engineering Experiment Station University of UTAH, USA. In contrast thereto, in the case of so-called core flow, the loose material would flow off only through a flow tube surrounded by dead zones. Since, however, no solids exchange takes place in the dead zones, reaction with a gas seeping past also no longer takes place after a short time.

The known crossflow process has, however, the disadvantage that, due to the necessary mass flux, very steep and correspondingly high outlet funnels are required, without lateral flow through the contents thereof, which therefore remain uninvolved in the reaction. A further disadvantage of the crossflow process is that two opposite cylinder walls of the reactor must be gas-permeable. At the same time, a trickling-out or blowing-out of solid must be avoided, especially on the cylinder wall located downstream. This is only insufficiently the case in the known design of the gas-permeable walls in the form of louvre-type slots or mutually overlapping plates. If screens are used in place of the plates, these also tend to block very easily. Therefore, in order to obtain an adequate gas permeability of the loose bed in the crossflow process, the use of crossflow reactors is restricted to relatively coarse loose materials having a grain size of more than 2 mm. Moreover, with continuous attrition, the not entirely avoidable dusty fines must be removed before the loose material is used again, since the dust blocks the flow channels located between the larger particles and hence causes a steady rise of the flow resistance. Crossflow reactors are therefore substantially more sensitive to attrition, which is therefore removed during regeneration and thus causes considerable costs.

The further disadvantage of the crossflow process is that the residence time of the gas is shorter than would be the case in a vessel with longitudinal flow. Both the countercurrent reactor and the crossflow reactor of the state of the art accordingly show considerable disadvantages.

If, in WO 87/00768 mentioned at the outset, a loose-material vessel is used which does not have a tapering outlet funnel in its bottom region, a mass flux is also impossible with this vessel because of the numerous internals as inflow trays, i.e. a core flow is established which leads to non-uniform flow of loose material through the vessel.

The same would apply to the cited DE 3,732,567, although this contains funnel-shaped loose-material outlets. In this loose-material outlet, however, extensive internals are inserted in the form of inflow trays, which prevent uniform flow throughout the vessel, i.e. mass flux.

SUMMARY OF THE INVENTION

By contrast, the moving-bed reactor according to the invention has the advantage that, owing to a special design of the funnel-shaped outlet of the loose-material vessel, mass flux is established within the reactor, i.e. the loose material drops downwards fully uniformly across the entire cross-section and does not form any separate flow tubes with dead zones surrounding the latter. Moreover, due to the design according to the invention of the funnel-shaped outlet, very uniform flow-through of the loose material, all of which flows down uniformly, is achieved. The gas to be introduced into the reactor is distributed via the outlet funnel of louvre-type structure with mutually overlapping plates almost across the entire cross-section, i.e. across the entire vessel cross-section of the reactor except for the size of the lowest outlet cross-section. In particular, no internal structures whatsoever for producing an inflow tray for uniform charging of the loose material with gas to be treated are therefore necessary. However, it is precisely this which creates the prerequisite for always establishing, within the vessel, a mass flux which only makes it possible for gas to flow uniformly through the loose material in its entire cross-section and its entire height. Only in this way is optimum effectiveness of the countercurrent process achieved. The invention here starts from the fundamental idea that uniform charging of the vessel interior across the entire cross-section, if possible, must take place without inflow trays arranged in the interior of the vessel. This is achieved by a mass flux outlet funnel, of louvre-type structure, of the loose-material vessel, the lateral, mutually overlapping, plate-like slots of the funnel serving as gas feed openings over a wide cross-sectional region of the vessel. Admittedly, WO 87/00768 also uses a plurality of inflow trays which have a roof-like structure and which are built up in louvre fashion or plate fashion. However, these roof-shaped internals are placed inside the vessel and very decisively affect the flow path of the downward-flowing loose material, so that only core flow can result here.

Advantageous further developments and improvements of the moving-bed reactor indicated in the main claim are possible as a result of the measures listed in the subclaims.

Of particular advantage is the arrangement of the louvre-type inlet openings at the outlet funnel of the vessel in such a way that different inflow resistances are generated due to different flow passage cross-sections. As a result, a uniform gas distribution over the entire funnel height can be achieved in this vessel region, depending on the gas inlet. This vessel region surrounding the louvre-type outlet funnel for the loose material can be formed by a further funnel-shaped vessel region or by a cylindrical vessel region.

Especially for the treatment of flue gases from power station installations, a particular interconnection of the moving-bed reactors is possible according to an advantageous further development of the invention. In this case, additional inflow trays, which serve as inlet openings for additional treatment gases, can be present inside one or more reactors.

Expediently, such moving-bed reactors are arranged in superposition, since the loose material can move by gravity from one reactor to another in series connection. If these reactors are each to be charged with flue gas in parallel connection, this can likewise be effected by superposed reactors, where the loose material flows only once through the entire cross-section of each reactor and is otherwise taken through single pipes within or outside the particular reactor.

BRIEF DESCRIPTION OF THE DRAWINGS

Advantageous and expedient illustrative examples of the invention are represented in the drawing and explained in more detail in the following description, with an indication of further features essential to the invention, and advantages. In the drawing.

DETAILED DESCRIPTION OF THE PREFERRED EMBODIMENTS

Figure 1:
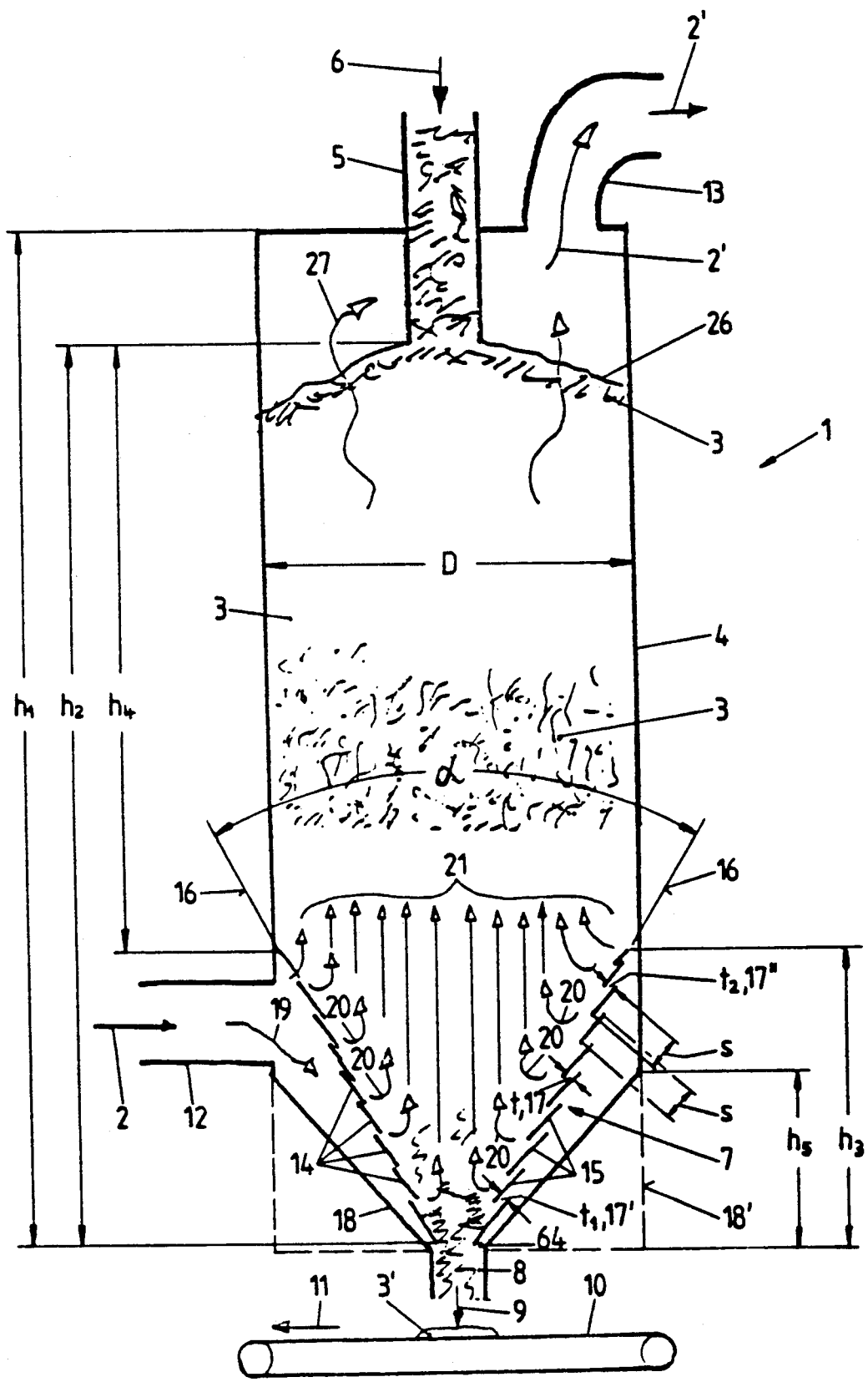
FIG. 1 shows a single moving-bed reactor with loose material flowing down and rising flue gas.

FIG. 1 shows a first illustrative example of a moving-bed reactor 1 for the treatment of fluids 2, in particular of flue gases 2 from power station installations, by means of a loose, i.e., particulate material 3. The loose material 3 consists, for example, of activated coke having a grain size of, for example, 2 mm. An adsorption of the pollutants in the flue gas takes place on this activated coke. This step is very extensively described in the relevant literature.

The moving-bed reactor 1 consists of a cylindrical or prismatic vessel 4 which is charged by means of an upper, central charging opening 5 with loose material 3, in general continuously (arrow 6).

The loose material 3 moves downwards in the vessel 4, while the flue gas 2 fed in the lower region of the vessel 4 flows upwards, so that a countercurrent results.

In its lower region, the vessel 4 has a downward-tapering funnel 7 which guides the loose material 3 to a bottom loose-material outlet 8. The loose material discharged from the vessel 4 (arrow 9) can, for example, be placed upon a conveyor belt (loose material 3') and discharged for further processing (arrow 11).

In FIG. 1, a feed pipe 12 for the flue gas 2 is shown in the lower region of the vessel 4 and a discharge pipe 13 for the treated and purified flue gas 2" is shown in the upper region.

The moving-bed reactor 1 shown in FIG. 1 has an overall height of $h_1$, a total loose-material height of $h_2$ and an effective funnel height of $h_3$. From this, the remaining loose-material height results as $h_4 = h_2 - h_3$ in the vessel 4 which has a diameter D. The aperture angle $\alpha$ of the funnel 7 is determined, as a function of the flow properties of the loose material, in such a way that mass flux is established everywhere in the moving-bed reactor, i.e. both in the upper part of the vessel 4 and in the funnel region 7, i.e. the loose material moves uniformly downwards in every cross-sectional region and does not form any individual flow tubes with surrounding dead zones.

According to the invention, the downward-tapering funnel 7 is now designed in louvre fashion with mutually overlapping, plate-shaped wall sections 14, whose surface centres 15 each lie on a common connecting line 16. The connecting lines 16 form the angle legs of the angle $\alpha$. The individual wall sections 14 have a length s, these wall sections overlapping by about ⅓ to half their length s. The spacing between each two overlapping wall sections 14 is marked "t". This spacing forms the effective cross-section for the flue gas 2 to pass through.

The louvre-type funnel 7 therefore forms, between every two neighbouring wall sections 14, a passage cross-section 17 of width t for the passage of the flue gas 2 flowing from the outside towards the funnel 7. For guiding the flue gas to the funnel 7, the gas is taken through the feed pipe 12 into a further, outer funnel 18 surrounding the louvre-type funnel 7 (arrow 19), so that the flue gas can enter the in prior region of the funnel through all the superposed passage cross-sections 17 through the louvre-type funnel 7. This flue gas entry is symbolically marked by the arrows 20. It is here already clear from FIG. 1 that the entry arrows 20 for the flue gas entering the louvre-type funnel 7 are distributed across the entire cross-section of the vessel 4. This is illustrated by the extension of the arrows 20 in the form of the combined arrows 21. Therefore, the flue gas 2 entering the moving-bed reactor can be distributed across the entire cross-section by means of the louvre-type funnel 7, without additional inflow trays being required inside the reactor. The louvre-type funnel 7 itself thus serves as an inflow tray and hence distributor tray.

In place of the outer funnel 18 which surrounds the actual louvre-type mass flux funnel 7, the funnel 7 can also be surrounded by a cylindrical shell 18'. This is indicated by the broken lines in FIG. 1. In the bottom outlet region 8, there is, between the outer funnel 18, 18' and the inner funnel 7, an annular gap 64 through which any loose material, which may pass into this interspace during the charging step of the reactor, can escape or run out downwards.

The flue gas 2 must be fed to the louvre-type funnel 7 in such a way that approximately the same flue gas rate enters the interior of the loose-material reactor from each passage cross-section 17. For this purpose, the cross-sectional width t of the passage cross-section 17 can vary over the height $h_3$ of the funnel 7, i.e. the flow cross-section is selected such that the desired flow in the loose-material reactor is estabished. If the flue gas 2 is fed to the vessel 4 by the the feed pipe 12 in the upper region of the funnel 7, the flue gas must move downwards to the lower wall sections of the funnel 7 with a certain pressure drop. Consequently, the lower passage cross-sections 17 would have to be designed larger than the upper passage cross-sections on the louvre-type funnel 7. In FIG. 1, the lower passage cross-section 17' of width $t_1$ is therefore greater than the upper passage cross-section 17" of a smaller passage cross-section $t_2$.

The flue gas entering the loose-material reactor in the lower region of the louvre-type funnel must also pass through a greater rise in height within the loose-material reactor through the loose material itself, which likewise leads to an additional pressure drop. From this aspect also, the passage cross-section 17 must therefore increase downwards between the wall sections 14, in order to reduce the flow resistance.

Figure 2:
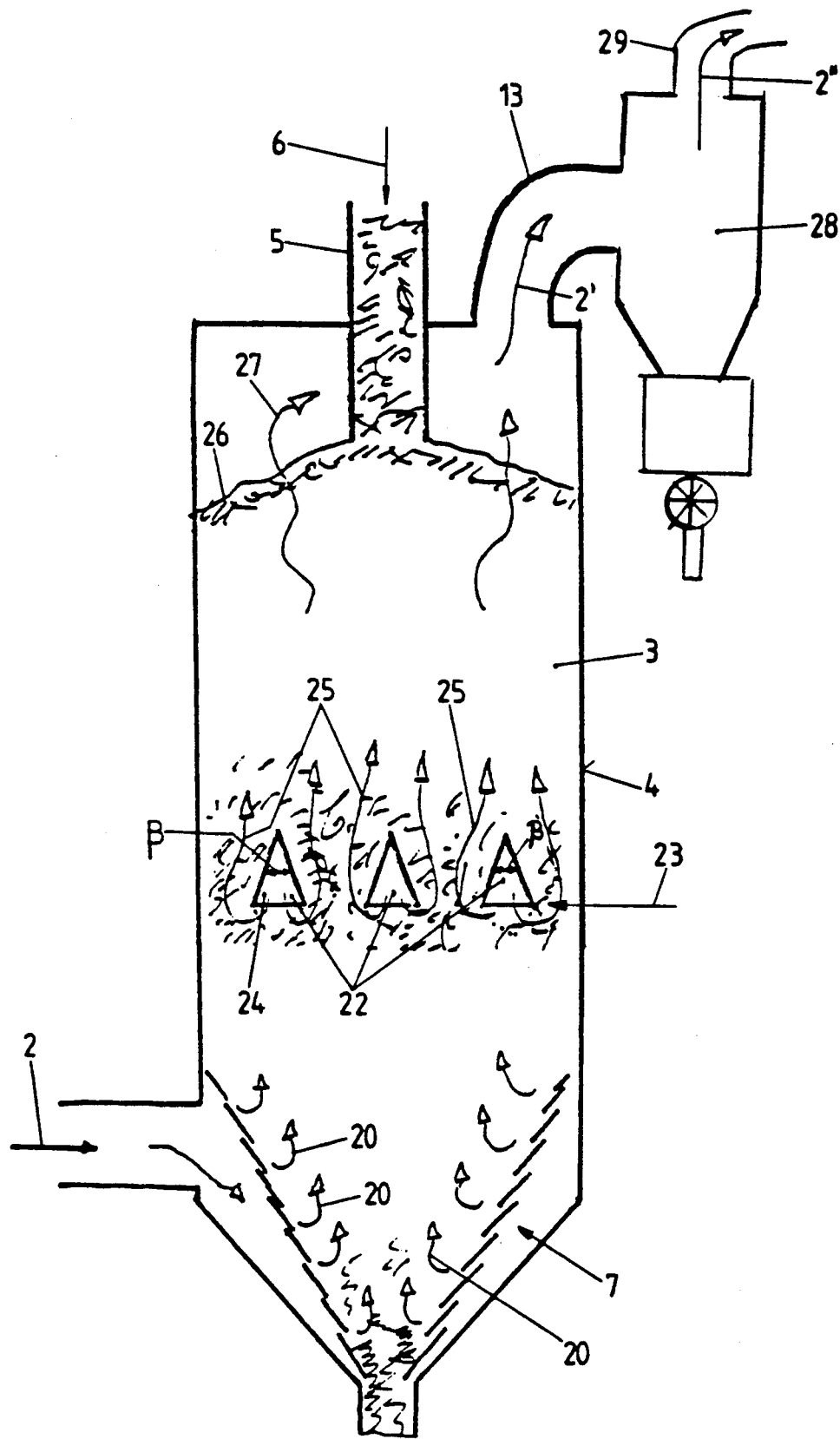
FIG. 2 shows a reactor according to FIG. 1 with a further inflow tray additionally provided inside the reactor, FIG. 3a and 3b each show two superposed moving-bed reactors in series arrangement.

The illustrative example according to FIG. 2 does not differ in principle from that according to FIG. 1. In addition to the illustrative example according to FIG. 1, a further inflow tray 22, which in its design corresponds in principle to the inflow trays in DE 3,732,576 A1, is provided inside the loose-material reactor, i.e. inside the vessel 4. The gas 23 fed to this additional inflow tray flows into individual, roof-shaped distributor elements 24 and from the latter, in the most uniform distribution possible, into the reactor space (arrow 25). The angle $\beta$ must here be fixed in such a way that undisturbed mass flux is again established between the roof-shaped internals. The lower louvre-type funnel 7 is of the same design as described for FIG. 1, i.e. the flue gas 2 fed to this funnel flows uniformly upwards in the loose-material reactor, corresponding to the arrows 20.

Figure 3A:
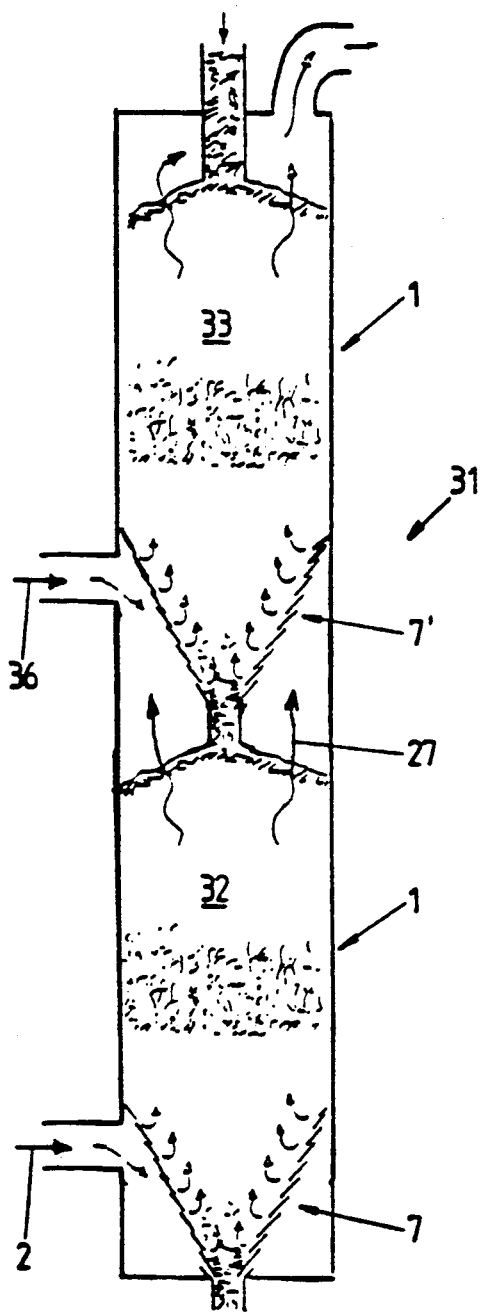
Figure 3B:
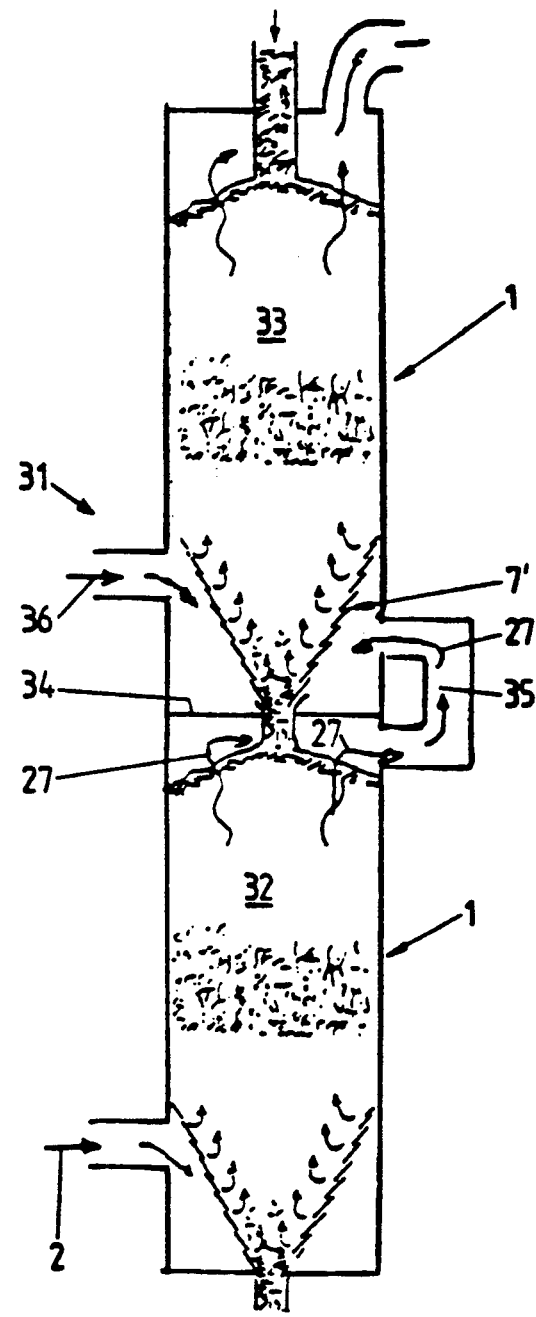

In the illustrative example according to FIG. 1 and FIG. 2, the flue gas treated in the loose material 3 flows out of the surface 26 of the loose material (arrow 27) in the upper region of the vessel 4 and passes through the discharge pipe 13 as treated flue gas 2' to the outside. In FIG. 2, a dust precipitation device 28 is additionally provided downstream, which separates further dust particles from the flue gas. The flue gas 2" thus purified passes via the outlet 29 into the open or into a further treatment stage. A recycling device 30 or disposal device 30 for the precipitated dust particles can be provided in the lower region According to the illustration in FIGS. 3a and 3b, the moving-bed reactors 1 according to the invention can be interconnected to form a combined installation, the lower reactor 32 forming the first reaction stage and the upper reactor 33 forming the second reaction stage in a series connection. Thus, the flue gas 2 can be fed to the lower louvre-type funnel 7 and flow through the first reaction stage of the moving-bed reactor 32 and leave at the surface thereof according to arrow 27. In FIG. 3a, this flue gas 27 flowing out and already purified in the first reaction stage 32 passes directly upwards and reaches the upper louvre-type funnel 7' of the second reaction stage 33. In the illustrative example of FIG. 3b, a partition 34 is located between the lower reaction stage 32 and the upper reaction stage 33, so that the gas 27 flowing out of the lower reaction stage 32 can be fed to the stage located above via a by-pass line 35. A second gas 36 can then be fed into the upper reaction stage both in the illustrative example according to FIG. 3a and that according to FIG. 3b, which second gas then acts only in the upper, second reaction stage 33. The gas 36 must then pass, like the flue gas 27 already purified in the first reaction stage, through the upper louvre-type funnel 7' and reaches the upper loose-material reactor of the upper reaction stage 33. In the illustrative example according to FIG. 3b, the gas 36 additionally fed to the upper reaction stage 33 can, because of the partition 34, not come into contact with the lower reaction stage 32.

Figure 4:
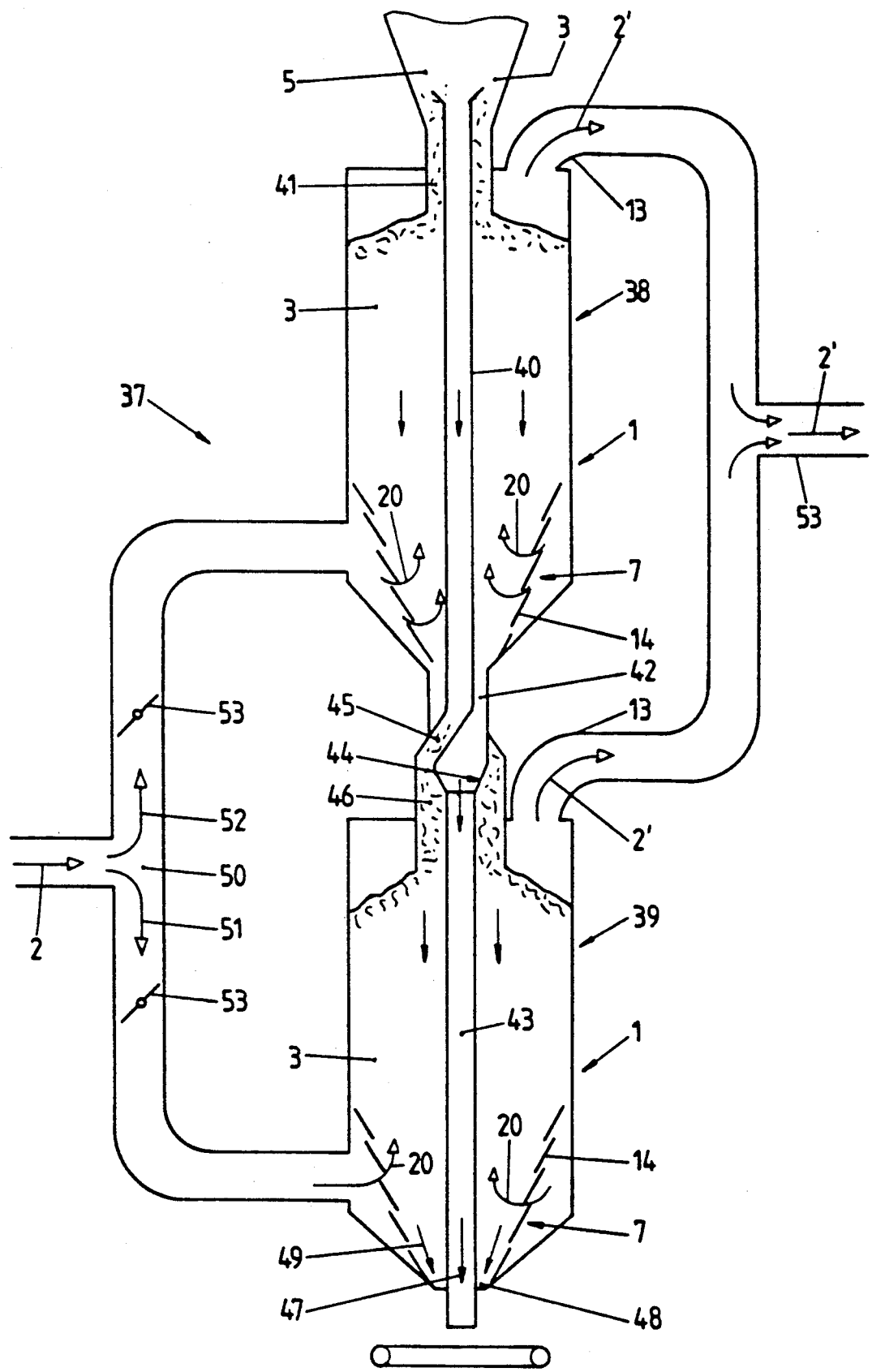
FIG. 4 shows two superposed moving-bed reactors in parallel arrangement and FIG. 5 shows a plurality of superposed moving-bed reactors operated in parallel.

The illustrative example of the invention according to FIG. 4 again concerns two superposed moving-bed reactors 1 which, however, are of the same structure in principle and form an overall installation 37. In contrast to the series arrangement of the two reaction stages 32, 33 in FIGS. 3a, 3b, however, the illustrative example according to FIG. 4 represents a parallel arrangement of these superposed loose-material reactors. Loose material 3 is fed to both the upper reactor 38 and to the lower reactor 39 via the upper charging funnel 5, the lower reactor 39 receiving this loose material via a central pipe 40 which runs through the centre of the entire upper reactor 38 and leads into the lower reactor 39. The upper reactor 38 is supplied with loose material 3 through the annular gap 41 surrounding the central pipe 40. Mass flux of the loose material 3 prevails in both the upper and lower reactors 38, 39. The loose material 3 discharged from the lower region of the upper reactor 38 reaches, after passing through the louvre-type funnel 7, a cylindrical take-off space 42 leading into a further central pipe 43 which passes through the centre of the lower reactor 39. The loose material of the upper reactor 38 therefore flows only through this reactor and then through the central pipe 43, whereas the loose material of the lower reactor 39 likewise flows only through this reactor, since it is fed to the latter through the central pipe 40.

In order likewise to ensure mass flux of the loose material 3 at the outflow from the upper reactor 38 in the cylindrical take-off space 42 with a funnel-shaped lower extension 44, this outflow is taken symmetrically downwards into the central pipe 43. For this purpose, the central pipe 40 otherwise penetrating the upper reactor 38 symmetrically has in this region a bend 45 which leads into an annular gap 46. In the lower region of the lower reactor 39, the loose material from the upper reactor 38 leaves through the central pipe 43 (arrow 47), whereas the loose material from the lower reactor 39 leaves via the annular gap 48 surrounding the central pipe 43 (arrow 49). The loose material is thus guided separately in the upper and lower reactors 38, 39. Mass flux prevails in both reactors.

The flue gas 2 flowing to the installation 37 is divided in a branch 50 into a part stream 51 and a part stream 52 and passed via adjustable restrictor flaps 53 to both the lower reactor 39 and the upper reactor 38. Feeding is here again effected in the manner of the installation described in FIG. 1, i.e. via a louvre-type funnel 7. The superposed reactors are accordingly operated in parallel, the flue gas 2' treated in either of the reactors 38, 39 being fed in each case in the upper region to a discharge pipe 13. This purified flue gas is then fed to a common discharge line 53.

Figure 5:
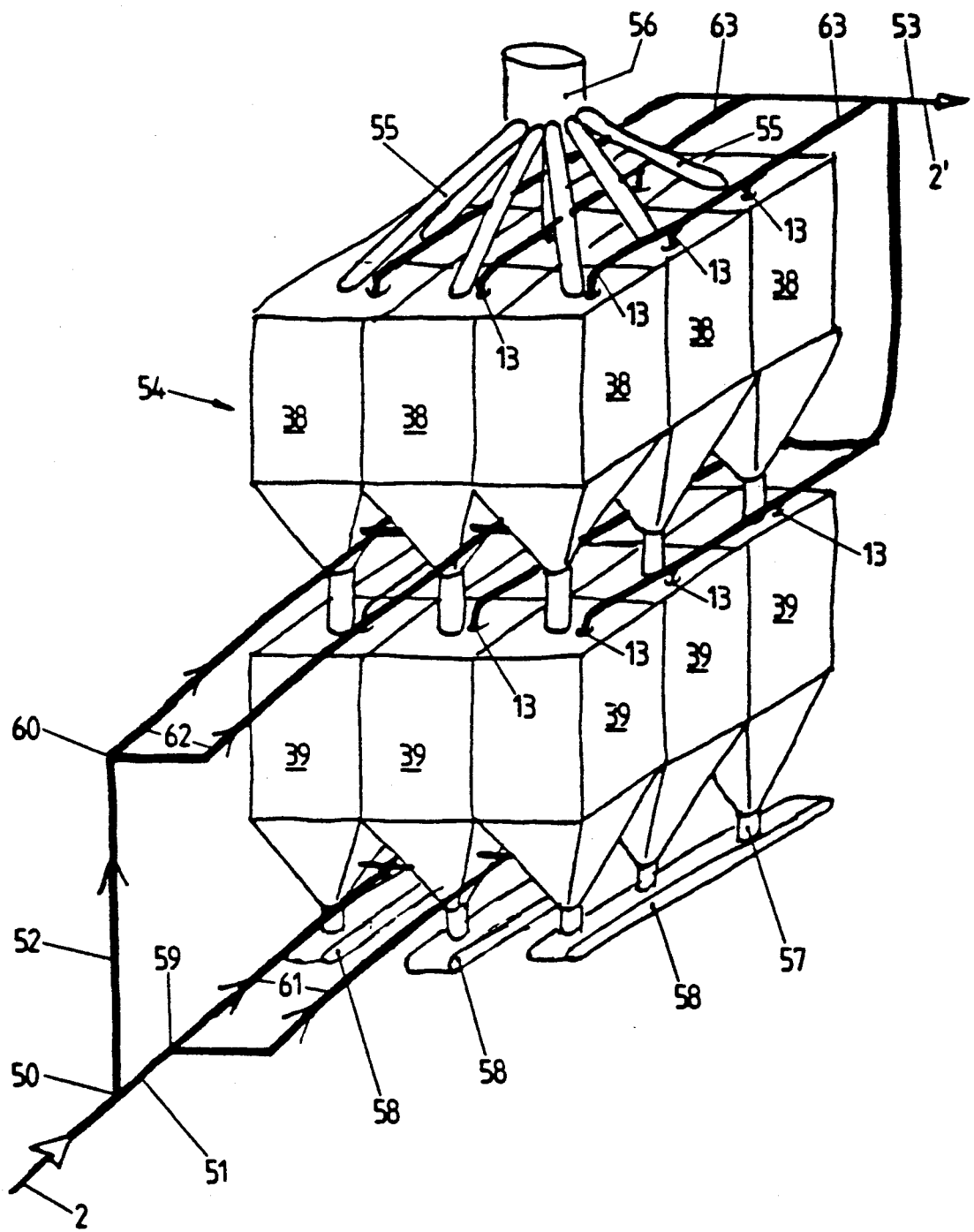

In the illustrative example according to FIG. 5, the reactors superposed in FIG. 4 but operated in parallel are connected side by side in a multiplicity to form an overall installation 54. In this case, two superposed reactors in each case are connected in the way described by reference to the illustrative example according to FIG. 4. Consequently, loose material is fed from a common loose-material container 56 to each upper reactor 38 by means of a feed line 55 common to each upper reactor 38 and lower reactor 39, which material in each case runs only through one of the two reactors 38, 39 and is discharged in common at the lower discharge opening 57 onto a conveyor belt 58. As described with reference to FIG. 4, the flue gas 2 to be treated is separated at a branch 50 into a lower part stream 51 and an upper part stream 52 which, according to the installation in FIG. 5, is again divided into further part streams 61, 62 at a lower branch 59 and an upper branch 60. These part streams 61, 62 then pass to the particular louvre-type funnels 7 of each individual moving-bed reactor. Accordingly, the gas to be purified flows through only a single moving-bed reactor and, at the particular upper end, passes into the discharge pipe 13 and from there via an outlet line 63 to a common discharge line 53.

The illustrative example according to FIG. 5 therefore represents moving-bed reactors which are connected in parallel and are arranged both above one another and next to one another.

The invention is not restricted to the illustrative example described and shown. Rather, it also comprises all skilled further developments without independent inventive content.

We claim:

1. A moving-bed reactor for the treatment of fluids, such as flue gases from power station installations, with a particulate material in a countercurrent process in which the particulate material moves continuously downwards and the fluid flow continuously upwards, the reactor comprising:

a vessel for a particulate material, said vessel having a first down-tapering funnel leading to an outlet for the particulate material in a lower region thereof, the particulate material uniformly sinking down in every cross-sectional area in the vessel and in the first funnel, said vessel further having an inflow aperture tray located in the lower region thereof for uniformly distributing the fluid across the vessel cross-sectional area;

said vessel further having a second funnel forming a lower portion further having a second funnel forming a lower portion of said vessel, wherein the first funnel is surrounded by a second funnel, the second funnel being a closed funnel having a larger angle of inclination and a smaller axial height than the first funnel, an annular canal being formed between the first and second funnels fluidly communicating with the particulate material outlet, the annular canal for removing from the reactor any particulate material which exists the vessel by the passages;

wherein the first funnel comprises louvered wall sections which form passages for the fluid to enter the vessel fed radially from outside the reactor, the first funnel having an angle of inclination whereby mass flux of the particulate material is established within the entire moving-bed reactor vessel; and wherein the cross-sectional areas of the passages formed by the wall sections of the first funnel are such that the fluid fed radially from the outside to the first funnel passes uniformly across the vessel cross-sectional area through the moving-bed reactor;

wherein each of the passages has a slot width, the slot widths varying over the height of the first funnel, whereby inflow of the fluid may be varied such that a fluid distribution results which in uniform across the first funnel cross-section;

2. The reactor as claimed in claim 1, wherein the second funnel has a fluid feed pipe for feeding the fluid into the vessel in the region of the first funnel, and wherein the cross-sectional area of the passages in the upper region of the first funnel is smaller than the cross-sectional area of passages in adjacent lower regions of the first funnel.

3. A moving-bed reactor as claimed in claim 1, wherein the first funnel forms a first inflow tray means for facilitating the inflow of the fluid and wherein a further inflow tray means for feeding a further fluid into the vessel is provided above the first funnel.

4. A moving-bed reactor arrangement having at least two moving-bed reactors as claimed in claim 1, wherein the at least two moving-bed reactors are connected in series such that particulate material is passed through respective vessels in series.

5. The reactor as claimed in claim 4, wherein the treatment takes place in two stages, the fluid being fed first to a lower, first reaction stage by the first funnel of the first reaction vessel of a lower one of the at least two reactors, and then to an upper, second reaction stage by the first funnel of the second reaction vessel of an upper one of the at least two reactors, a further gas can also being bed to the second reaction vessel via the first funnel thereof.

6. A moving-bed reactor arrangement having at least two moving-bed reactors as claimed in claim 1, wherein the at least two moving-bed reactors are connected in parallel such that particulate material is passed through the vessels in parallel.

7. The reactor as claimed in claim 6, wherein the at least two moving-bed reactors comprise upper and lower reactors, and wherein, the particulate material is fed to the lower reactor via a central pipe in the upper reactor, and the particulate material taken off from the upper reactor is discharged via a central pipe through the lower reactor together with the particulate material from the lower reactor in the bottom region thereof.

8. The moving-bed reactor as claimed in claim 7, wherein a multiplicity of upper and lower moving-bed reactors connected in parallel are arranged side by side and interconnected such that particulate material is provided to them and discharged from them in common in a parallel arrangement, upper and lower vessel of the reactors being provided with the same fluid in parallel.

9. A moving-bed reactor as claimed in claim 1, wherein the moving-bed reactor vessel comprises a cylindrical vessel.

10. A moving-bed reactor as claimed in claim 1, wherein the moving-bed reactor vessel comprises a prismatic vessel.

11. A moving bed reactor arrangement, having at least two moving-bed reactors, for the treatment of fluids, such as flue gases from power station installations, with a particulate material in a countercurrent process in which the particulate material moves continuously downwards and the fluid flows continuously upwards, each reactor comprising:
  a vessel for the particulate material, said vessel having a downward-tapering funnel leading to an outlet for the particulate material in a lower region thereof, the particulate material uniformly sinking down which defines a mass flux in every cross-sectional area in the vessel and in the funnel, said vessel further having an inflow aperture tray located in the lower region thereof for uniformly distributing the fluid across the vessel cross-sectional area;
  wherein the tapering funnel comprises lowered wall sections which form passages for the fluid to enter the vessel fed radially from outside the reactor, the funnel having an angle of inclination whereby said mass flux of the particulate material is established within the entire moving-bed reactor vessel; and
  wherein the cross-sectional areas of the passages formed by the wall sections of the funnel are such that the fluid fed radially from the outside to the funnel passes uniformly across the vessel cross-sectional area through the moving-bed reactor;
  wherein the at least two moving-bed reactors are connected in parallel such that particulate material is passed through the vessels thereof in parallel;
  wherein the at least two moving-bed reactors comprise upper and lower reactors, and wherein the particulate material is fed to the lower reactor via a central pipe in the upper reactor, and the particulate material taken off from the upper reactor is discharged via a central pipe through the lower reactor together with the particulate material from the lower reactor in the bottom region thereof.

12. The moving-bed reactor arrangement according to claim 11, wherein a multiplicity of upper and lower moving-bed reactors connected in parallel are arranged side by side and interconnected such that particulate material is provided to said multiplicity of upper and lower moving-bed reactors and discharged from said multiplicity of upper and lower moving-bed reactors in parallel, and such that upper and lower vessels of the reactors are provided with the same fluid in parallel.

13. A moving bed reactor for the treatment of fluid in a countercurrent process, comprising:
  a reactor vessel having, in an upper region thereof, for discharging treated fluid, the reactor material and an outlet for discharging treated fluid, the reactor vessel also having, in a lower region thereof, a downward tapering first funnel leading to an outlet, the first funnel guiding the particulate material to the outlet for discharge from the reactor vessel, the first funnel being formed by louvered wall sections to create passages for the fluid to be treated to enter the vessel;
  said vessel further having a second funnel forming a lower portion of said vessel, the second funnel having an inlet for receiving the fluid to be treated, an annular canal being formed between the first and second funnels fluidly communicating with the particulate material discharge outlet so that any particulate material which enters the second funnel by the passages is guided to the particulate discharge outlet through the annular canal;

14. The reactor according to claim 13, wherein each of the passages has a slot width, the slot widths varying over the height of the first funnel, whereby inflow of the fluid may be varied such that a fluid distribution results which is uniform across the first funnel cross-section.

* * * * *